US006085257A

United States Patent [19]

Ducaroir et al.

[11] Patent Number: 6,085,257

[45] Date of Patent: Jul. 4, 2000

[54] ENHANCED RECEIVING CHIP FOR A COMPUTER MONITOR

[75] Inventors: Francois Ducaroir, Santa Clara; Karl S. Nakamura, Palo Alto; Michael O. Jenkins, San Jose, all of Calif.

[73] Assignee: LSI Logic Corporation, Milpitas, Calif.

[21] Appl. No.: 08/951,896

[22] Filed: Oct. 16, 1997

[51] Int. Cl.[7] .......... H04N 7/14

[52] U.S. Cl. .......... 710/1; 345/204

[58] Field of Search .......... 710/1, 100; 348/476; 455/76, 404; 370/112, 84, 395, 402

[56] References Cited

U.S. PATENT DOCUMENTS

| | | | |
|---|---|---|---|
| 4,949,169 | 8/1990 | Lumelsky et al. . | |
| 5,020,135 | 3/1987 | Kasparian et al. | 455/76 |
| 5,079,770 | 11/1989 | Scott | 370/112 |
| 5,182,642 | 1/1993 | Gersdorff et al. . | |
| 5,410,547 | 4/1995 | Drain . | |
| 5,557,663 | 9/1996 | Huang et al. . | |
| 5,577,208 | 11/1996 | Couturier . | |
| 5,594,660 | 1/1997 | Sung et al. . | |
| 5,594,921 | 1/1997 | Pettus . | |
| 5,642,139 | 6/1997 | Eglit et al. . | |
| 5,642,497 | 6/1997 | Crary et al. . | |
| 5,664,218 | 9/1997 | Kim et al. . | |
| 5,666,491 | 9/1997 | Harris, Jr. et al. . | |
| 5,751,222 | 5/1998 | Trainor et al. . | |
| 5,796,440 | 2/1996 | Rupinski et al. | 348/476 |
| 5,802,281 | 9/1998 | Clapp et al. . | |
| 5,872,784 | 3/1995 | Rostoker et al. | 370/395 |
| 5,890,061 | 2/1996 | Timmet al. | 455/404 |

OTHER PUBLICATIONS

LSI Logic CoreWare System–on–a–Chip Design Program, LSI Logic Corporation, Jul. 1996, pp. 1–20.

*Primary Examiner*—Joseph E. Ralys
*Assistant Examiner*—Omar A. Omar
*Attorney, Agent, or Firm*—Conley Rose & Tayon; Kevin L. Daffer

[57] ABSTRACT

An improved transceiver that is tightly integrated into an enhanced receiving chip for a computer monitor. The transceiver includes a receiver having a first input port for receiving serialized data, a first output port for transmitting deserialized data to the transceiver, and a second input port adapted for receiving feedback data forwarded from a sensor to an audio and video control unit. The serialized data comprises video, audio and control data. The transceiver further comprises a receiver operably coupled between the first input port and the first output port, as well as a timing generator coupled to recover a clock signal from the serialized data and to synchronize the deserialized data from the recovered clock. The transceiver also includes a transmitter with a third input port for receiving parallel data and a second output port for transmitting a serial data stream. The parallel data are received by the third input port concurrently with the serialized data being received by the first input port. A deserializer is coupled to convert the serialized data into the deserialized data. A serializer is coupled to convert the parallel data into the serial data stream. The transceiver is also part of a communications module, adapted for use in a monitor, also including a timing generator for generating a clock for synchronized timing, control registers for storing native format control data, and a sound generator for producing audio signals which correspond to native format audio data sent to the communications module from a base computer.

18 Claims, 4 Drawing Sheets

ENHANCED RECEIVING CHIP FOR A COMPUTER MONITOR

BACKGROUND OF THE INVENTION

1. Field of the Invention

This invention relates to computer systems in general and, more particularly, to a receiving chip including a transceiver for receiving and deserializing serialized data at a computer monitor while simultaneously transmitting serialized feedback control data obtained from a sensor back to the main computer which may be some distance away from the computer monitor.

2. Description of Related Art

The concept of sending video data to a computer monitor is generally well known. A typical video card is illustrated in FIG. 4 shown as an add-in card for an input/output (I/O) bus 340 with connector 400. Signals forwarded through connector 400 include control data (shown with open arrowheads) and data (shown with solid arrowheads). These signals may be forwarded from the I/O bus 340 into a graphics display processor 410 which manipulates the incoming video data for output to the monitor through a parallel output port 450 having parallel data lines.

Typically, 32 bit data and various control data are output from the graphics display processor 410 into video RAM (Random Access Memory) 420 such as EDO (Extended Data Out) RAM, VRAM (Video RAM) or SGRAM (Synchronous Graphics RAM), usually dual ported memory, in amounts of 1 MB (MegaByte), 2 MB, 4 MB or even 8 MB. As illustrated, 4 MB of video RAM 420 are assumed in four banks of memory as is well known in the art. Each bank outputs 32 bits of video data to a graphics interface 430 which also accepts control data from the graphics display processor 410 and outputs the video data to a RAMDAC (RAM Digital-to-Analog Converter) 440 for conversion from digital data into the analog data required by most standard analog computer monitors Video data may also be returned to the graphics interface 430 from the RAMDAC 440. The RAMDAC 440 outputs video data to the display of the standard monitor through the parallel output port 450. Command information for the video data from the graphics display processor 410 may also be included in the output parallel data stream to the standard monitor.

The use of a sound card to transmit audio data to a set of speakers is also well known, as is the idea that audio and video data may be combined and synchronized. Problems arise in keeping the audio and video in synch without using separate clocks that must be continually rechecked. If a single clock is used, distances between the audio card and video card may cause timing delays that must be accounted for. Is it also generally useful to have a user feedback device (e.g. mouse, keyboard, or touch screen) located on or near the display. It is typical for a separate cable to be used which connects between the computer unit itself and the feedback device.

A system is therefore needed which is inexpensive to build yet integrates audio, video and control data and its transmission from a base computer system to a monitor. A minimum number of data lines, pins and other connections are also needed. For ease of integration into legacy systems, this enhanced system should be manufacturable as a single chip solution, preferably in CMOS (Complementary metal Oxide Semiconductor) and not more expensive semiconductors such as GaAs (gallium arsenide) or BiCMOS (Bipolar CMOS). The ability to accept and transmit feedback data from the user at the monitor is also desirable. Even more desirable is the ability to keep the feedback data from the remote sensor in synch with the audio, video and control data that lead to the response of the user.

SUMMARY OF THE INVENTION

The problems outlined above are in large part solved by an improved transceiver that is densely integrated into an enhanced receiving chip for a computer monitor. Broadly speaking, the transceiver includes a receiver having a first input port for receiving serialized data, a first output port for transmitting deserialized data from the transceiver, and a second input port adapted for receiving feedback data forwarded from a sensor to an audio and video control unit. The serialized data comprises video, audio and control data. The transceiver further comprises a receiver operably coupled between the first input port and the first output port, as well as a timing generator coupled to recover a clock signal from the serialized data and to synchronize the deserialized data from the recovered clock. The transceiver also includes in one embodiment a transmitter comprising a third input port for receiving parallel data and a second output port for transmitting a serial data stream.

Additional features of the transceiver may include parallel data which is received by the third input port concurrently with the serialized data received by the first input port, a deserializer coupled to convert the serialized data into the deserialized data, a serializer coupled to convert the parallel data into the serial data stream, and the ability to accept feedback data from a sensor. The sensor may dispatch feedback data in response to palpable input, optical input, sonic input, or physical contact on the sensor, as desired.

The transceiver is preferably embodied in a communications module, adapted for use in a digital monitor. The communications module may also include, in one embodiment, a timing generator for generating a clock signal for synchronized timing in the communications module, control registers for storing native format control data, and a sound generator for producing audio signals which correspond to native format audio data sent to the communications module from a base computer.

The transceiver is designed for transmitting and receiving serialized video, audio and control data and includes a receive buffer; a receiver including a deserializer, clock recovery and data alignment logic, and a receive clock generator; and a transmitter including a serializer and a transmit buffer. The receive buffer receives the serialized video, audio and control data. The receiver includes a receive buffer which receives the serialized video, audio and control data. The deserializer converts the serialized video, audio and control data into native format video, audio and control data. The recovery and alignment logic coupled to the deserializer recovers the native format video, audio and control data and synchronizes the native format video, audio and control data with each other. The receive clock generator recovers a data clock from the serialized video, audio and control data. The transmitter receives outgoing video, audio and control data in their native formats and transmits the outgoing video, audio and control data. The serializer couples to the transmit buffer and converts the outgoing video, audio and control data into serialized video, audio and control data. The transmit clock generator coordinates serialization and transmission of the serialized video, audio and control data before sending the serialized data to the transmit buffer which holds the serialized video, audio and control data before transmission. The communications module is preferably a monolithic integrated circuit, which is also preferably a CMOS integrated circuit.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
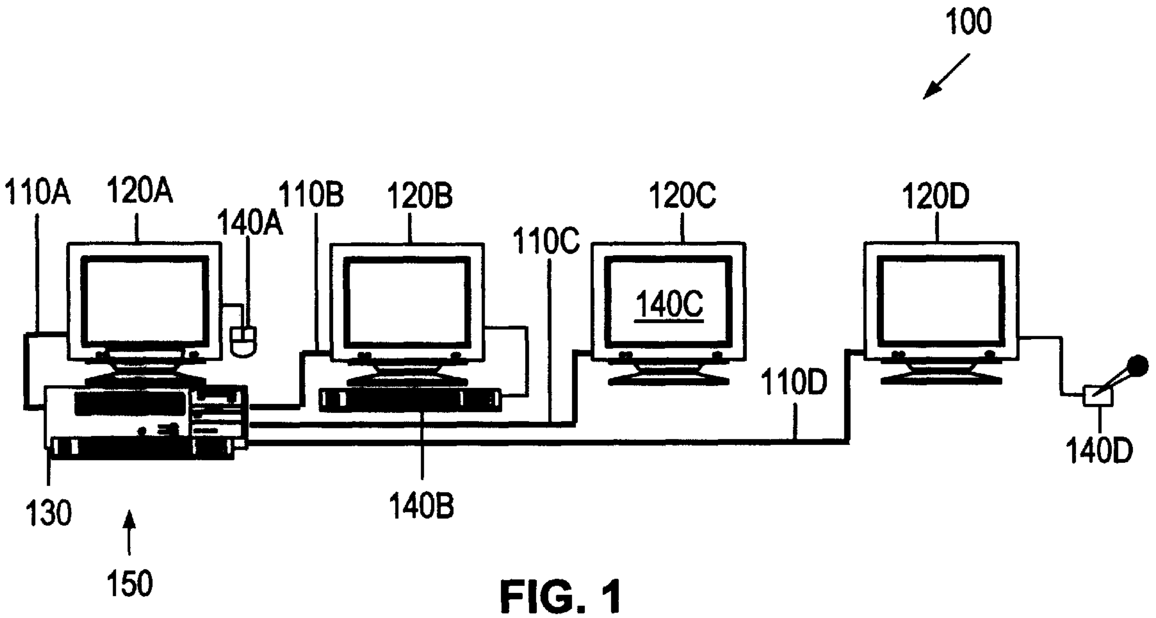
FIG. 1 is a computer network having a server computer and three remote terminals, each employing a high speed serial connection and feedback sensor through the monitor according to one embodiment of the present invention.

The use of a letter as part of a number designating a component of a system described in this document will be to show multiple instances of equivalent components. All figures will use a uniform numbering system with identical parts across the figures being given identical numbers, Turning now to the drawings, FIG. 1 shows a computer network 100 according to one embodiment of the present invention. Server computing system 150, which will be described in more detail below with respect to FIG. 2, includes a computer 130 having an enhanced video card 200 according to another embodiment of the present invention, an enhanced monitor 120A according to still another embodiment of the present invention, with the computer 130 and the monitor 120A connected by a high speed serial line 110A. Further details concerning the enhanced video card 200, enhanced monitor 120 and the high speed serial line 110 will be described hereafter with respect to other figures.

Connected to the server computing system 150 are three additional terminals, monitors 120B, 120C and 120D, connected to the server computer 130 by high speed serial lines 110B, 110C and 110D, respectively. Monitor 120B is shown with a feedback sensor 140B which may be keyboard. Other feedback sensors 140 which respond to palpable input may also be used. Another example of similar feedback sensors 140 are those which provide an output signal or control data in response to physical contact upon the sensor. Monitor 120C shown with a feedback sensor 140C, which is a touch sensitive screen, is another example of this type of sensor. Monitor 120D is shown with a feedback sensor 140D which is a microphone. Other sensors which provide control data output to sonic or sound wave input are also contemplated. Optical input, such as through a light pen, is also contemplated. Other forms of energy which may be converted to electrical, optical or other relevant forms of energy for input into a computer system through an input device or sensor may also be used.

Other numbers of monitors 120 with associated serial connections 110 and other components are also contemplated. Three such groups are shown only for the sake of simplicity. It is contemplated that the computer system 100 could be placed in a classroom or other instructional facility with the teacher facilitating server computing system 150 and the pupils at the monitors 120. Instructional material could be sent collectively to all monitors 120 or individualized material could be sent separately to each monitor 120. Pupils would provide feedback appropriate to their learning experience via their respective sensor 140 to the teacher.

The digital monitor 120 shown in various embodiments in FIG. 1 also preferably includes, or is connected to, speakers (not shown) for providing sound output for a complete multimedia experience with video and audio data synchronized together and with data provided through the sensors 140. Data transmitted from the server computing system 150 to monitor 120A or to any one of the other monitors 120B–120D and carried through communication lines 110A–110D are converted to native format video, audio and control data by an advanced transceiver, also called a communications module, which will have various embodiments described in detail with respect to FIGS. 5–7 hereafter.

Figure 2:
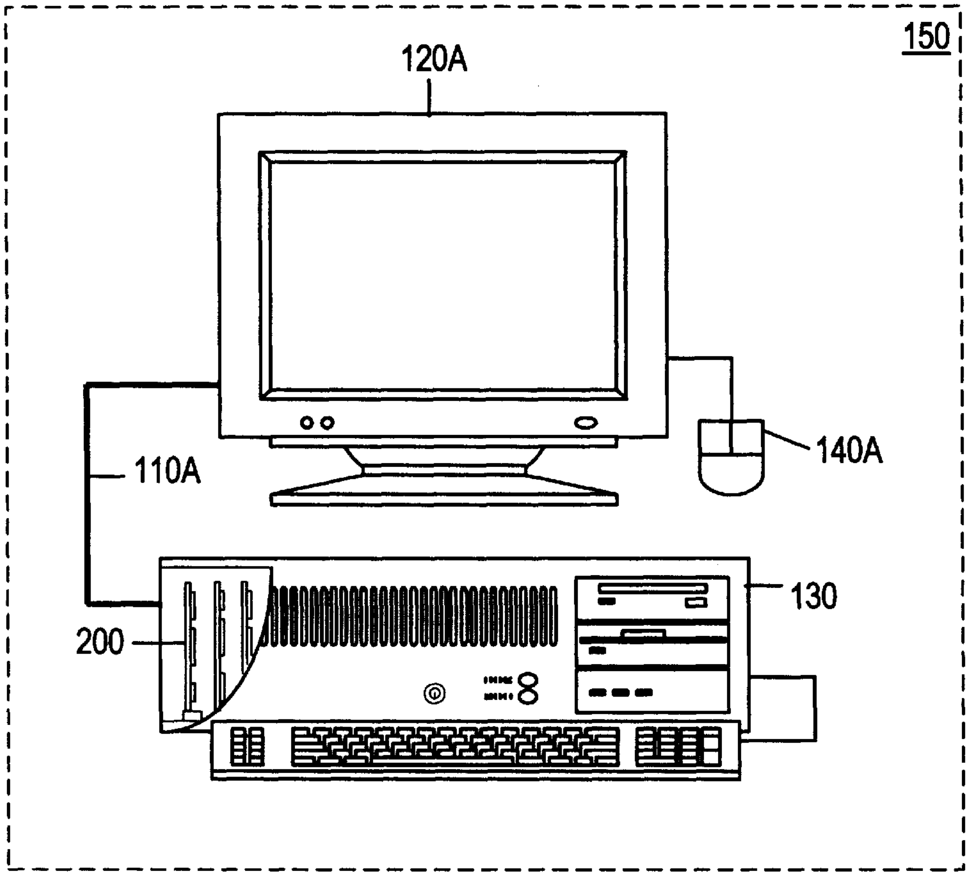
FIG. 2 is close-up and cut-away view of the server computer of FIG. 1 showing the enhanced video card according to one embodiment of the present invention.

A more detailed look in FIG. 2 at server computing system 150 is shown without the additional data connections 110B–110D, monitors 120B–120D and related sensors 140B–140D of the computer network 100 given in FIG. 1. A standard keyboard is shown with computer 130. An enhanced video card 200 is shown through a cut-away as being present in computer 130. The enhanced video card 200 is coupled in the rear (not shown) to the high speed serial line 110A which transmits audio, video, control and feedback data to and from the computer 130 and the monitor 120A. Attached to monitor 120A is a light pen 140A as an embodiment of sensor 140. Speakers (not shown) accept output audio data from the enhanced video card 200.

Enhanced video card 200 and monitor 120A each include an advanced transceiver. A base transceiver is present within enhanced video card 200, and a remote transceiver is present in monitor 120A. High speed serial connection 110A between the base transceiver and the remote transceiver provides the serial data transfer of audio, video and control data from the enhanced video card 200 to the monitor 120A and feedback data or control data from the sensor 140A to the computer 130. Additional details concerning the enhanced video card 200 and the transceivers will be given below with respect to FIGS. 5–7.

Figure 3:
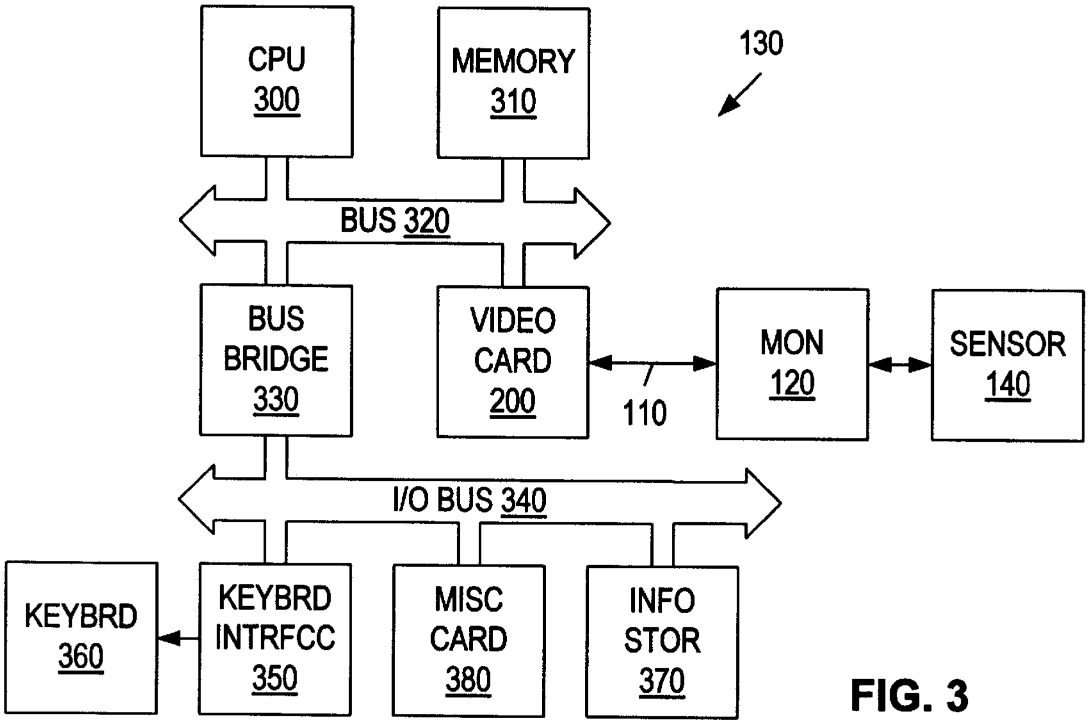
FIG. 3 is a block diagram of the server computer in FIG. 2 according to one embodiment of the present invention.

Computer 130 is further detailed in FIG. 3 with a diagram of one embodiment of the preferred system components. A CPU 300 is operably coupled to a memory 310 through a bus 320, along with enhanced video card 200. A bus bridge 300 operably couples bus 320 to I/O bus 340 which has shown connected to it a keyboard interface 350, an information storage device 370, such as an IDE hard drive or SCSI CD-ROM through an appropriate controller, and an expansion or miscellaneous card 380 with other or miscellaneous purpose, such as a network card or additional SCSI controller, for example. A standard keyboard 360 is attached off of the keyboard interface 350. Devices such as the enhanced video card 200 or the information storage device 370 may also be operably coupled into computer 130 through the other bus 320 or 340 as desired. In an embodiment where sensor 140 is a keyboard, the keyboard interface 350 and the standard keyboard would not be needed. Other standard parts or components may be added to the computer 130 as desired through additional or substitute connections to bus 320 and/or I/O bus 340.

Enhanced video card 200 is directly connected to the monitor 120 via high speed serial connection 110. Sensor

140 directly couples to monitor 120. Note that the connections between the enhanced video card 200 and the monitor 120, and the monitor 120 and the sensor are bi-directional with data being transferred both ways between the respective devices. High speed serial connection 110 also preferably includes a return high speed serial line for return and/or feedback data transmission.

Bus 320 and I/O bus 340 are preferably parallel buses, defined as a plurality of data and address lines which convey data from one device attached to that bus to another device attached to that bus. Of course, using bus bridge 330, devices on the bus 320 may communicate with devices on the I/O bus 340 and vice versa. Native format video, audio and control data in parallel format are transmitted from various components of computer 130 to the enhanced video card 200. The data are there serialized for transmission on the serial connection 110 for transfer to the monitor 120. At monitor 120, the data are deserialized and converted back into native format for display, audio output or operation as appropriate to the type of data, i.e., video, audio or control. The reverse parallel-to-serial-to-parallel operations are carried out with respect to the feedback or sensor control data being transmitted from the monitor 120 to the enhanced video card 200 for inclusion into the operations of the computer 130. For the purposes of this document, video data and audio data shall include still, motion, or graphics data, audio data in the audible range or any related data as is well known in the art. Control data may provide operational control of the video and/or audio data by the monitor 120 display and/or speakers (not shown) and/or the computer 130 CPU 300 and/or other processing device or unit (not shown). Illustrative examples of the resultant operations from such control data include changing contrast, brightness, volume, power levels, etc.

Figure 4:
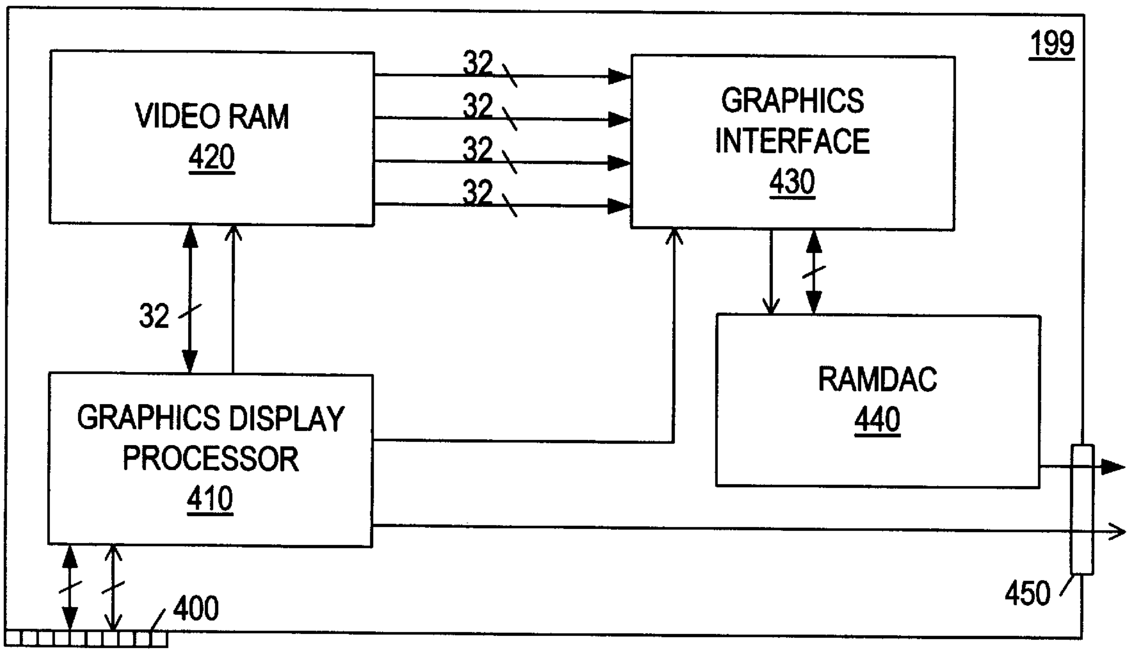
FIG. 4 (PRIOR ART)
FIG. 4 is a block diagram of a prior art video card.

For comparison purposes, a prior art video card is illustrated in FIG. 4. Shown as an add-in card for I/O bus 340 with connectors 400, control data (shown with open arrowheads) and data (shown with solid arrowheads) are input from the I/O bus 340 into a graphics display processor 410 which manipulates the incoming video data for output to the display of the monitor 120 through a parallel output port 450 on parallel data lines (not shown).

Typically, 32 bit data and various control data are output from the graphics display processor 410 into video RAM 420 such as EDO RAM, VRAM or SGRAM, usually dual ported memory, in amounts of 1 MB, 2 MB, 4 MB or even 8 MB. As illustrated, 4 MB of video RAM 420 are assumed in four banks of memory as is well known in the art. Each bank outputs 32 bits of video data to a graphics interface 430 which also accepts control data from the graphics display processor 410 and outputs the video data to a RAMDAC 440 for conversion from digital data into the analog data required by most standard computer monitors. Video data may also be returned to the graphics interface 430 from the RAMDAC 440. The RAMDAC 440 outputs video data to the display of the standard analog monitor through a parallel output port 450. Command information for the video data from the graphics display processor 410 may also be included in the output parallel data stream to the standard monitor.

Figure 5:
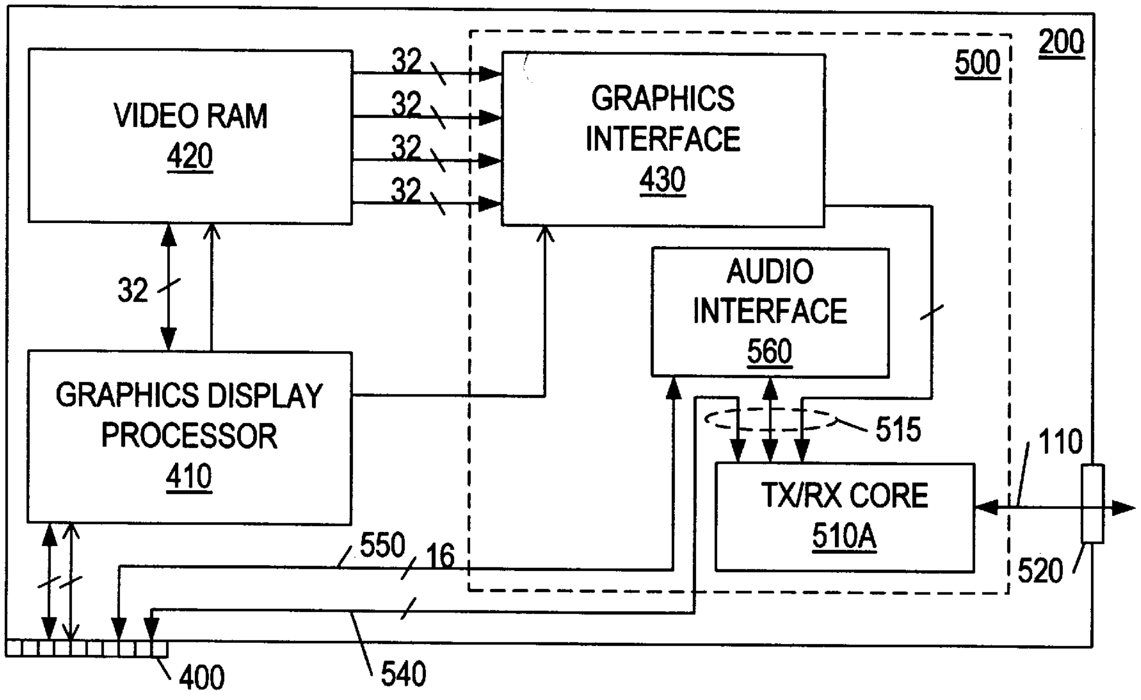
FIG. 5 is a block diagram of one embodiment of an enhanced video card, according to the present invention, which includes an audio interface.

In contrast, FIG. 5 illustrates an enhanced video card 200 according to the present invention which acts as an audio/video interface 200 for computer 130. Shown as an add-in card for bus 320 with connectors 400, control data (shown with open arrowheads) and data (shown with solid arrowheads) are input from the bus 320 into a graphics display processor 410 coupled to accept commands from the CPU and data from the main memory and which manipulates the incoming video data for output to the display of the monitor 120 through a base serial output port 520 on a high speed serial connection 110 coupled between the base serial output port 520 and a remote serial input port, which will be seen below with respect to FIG. 6. Data are also transferred via parallel data lines 540 directly into a base transceiver 510A, also called a TX/RX (transmit/receive) core 510A. Additionally, 16 bit audio data may be transferred directly to the audio interface 560 by way of parallel data lines 550.

Transceiver 510 preferably includes an encoder/decoder pair for encoding of the data prior to transmission and decoding of the data subsequent to transmission. Encoding is performed to provide desirable characteristics incorporated into the data stream. Some desirable characteristics include: transitions so that clocks can be recovered, parity for error checking, DC balance, and extra characters that can be used for controls, such as, start, end, and error. The only necessary encoding requirement is at least one transition every ten bits. The encoding is preferably 8B/10B encoding although other encoding schemes are contemplated. The 8B/10B encoding is described in U.S. Pat. No. 4,486,739, titled Byte Oriented DC Balanced (0,4) 8B/10B Partitioned Block Transmission Code, whose inventors were Peter A. Franaszek and Albert X. Widmer, and which was assigned to International Business Machines Corporation, which is hereby incorporated by reference in its entirety. Encoding preferably occurs just prior to the data being input to the transceiver 510, preferably at port 515.

Typically, 32 bit data and various control data are output from the graphics display processor 410 into video RAM 420 such as EDO RAM, VRAM or SGRAM, usually dual ported memory, in amounts of 1 MB, 2 MB, 4 MB or even 8 MB. The video RAM 420 is coupled to accept and store processed graphics and video data output by the graphics display processor. As illustrated, 4 MB of video RAM 420 are assumed in four banks of memory as is well known in the art. Each bank outputs 32 bits of video data to a graphics interface 430 which also accepts control data from the graphics display processor 410 and outputs the video data in digital form to the base transceiver 510A for combining the video, audio and control data for serial, encoded transfer to the monitor 120. A base parallel input port for receiving parallel data from other components (not shown) conducts parallel input data into an improved graphics interface unit 500 and particularly TX/RX core 510A. The improved graphics interface unit 500, including the graphics interface 430, the audio interface 560 and the base transceiver 510A, is preferably a single monolithic integrated circuit This single monolithic integrated circuit is preferably CMOS but may also be composed of other semiconductor materials as desired.

Figure 6:
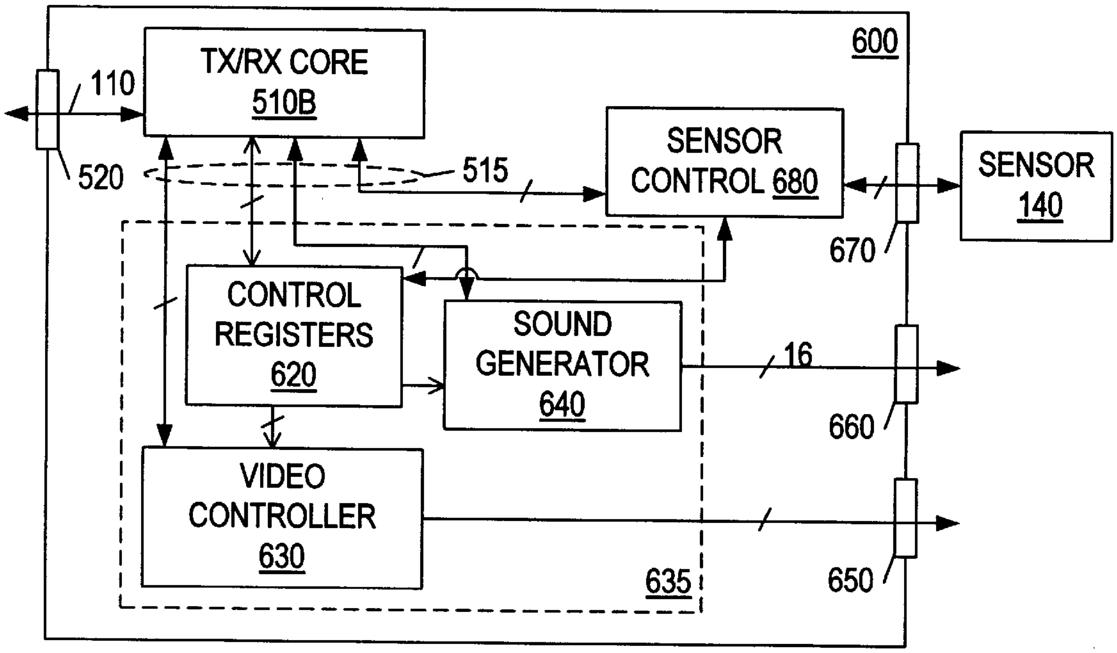
FIG. 6 is a block diagram of one embodiment of an enhanced receive chip for a computer monitor, according to the present invention, which includes a sound generator and a feedback sensor connection.

In FIG. 6, a receive chip 600, also called a communications module 600 or simply a transceiver 600, is illustrated in a preferred embodiment. The high speed serial connection 110 couples to the communications module 600 through a first input port 520 for receiving serialized data. A remote transceiver 510B, also called TX/RX core 510B, receives the serialized, encoded data and outputs through a first output port 515 for transmitting deserialized data to an audio and video control unit 635. A second input port 670 is adapted for receiving feedback data forwarded from a sensor 140 to the remote transceiver 510B. The serialized data may comprise video, audio and control data as described with respect to FIG. 3

The audio and video control unit 635 preferably comprises control registers 620, a video controller 630 and a sound generator 640. Control data are sent from the TX/RX core 510B to the control registers 620 after being decoded and may be output to the video controller 630 and/or the sound generator 640. Control/feedback data may also be forwarded from the sensor control 680. The video controller 630 transfers video data through output port 650 to the display unit (not shown) of the monitor. In the preferred embodiment, the display unit is digital, such as one using TFTs (Thin Film Transistors) to actuate each pixel, and can accept the video data in digital format. Should a standard analog display unit be desired, a RAMDAC may be incorporated into the video controller 630. The sound generator 640 outputs stereo or monaural sound through output port 660 to the speakers (not shown). Although shown as both separate and combined ports in some cases, input and output ports (such as 450, 520, 650, 660, 670, etc.) may be combined or separated as necessary for convenience or for cost considerations in manufacturing.

The remote transceiver 510B further comprises a receiver, see FIG. 7 below, operably coupled between the first input port 520 and the first output port 515. A transmitter described in detail in FIG. 7 included in the remote transceiver 51 OB preferably includes a third input port (shown combined with first output port 515 for simplicity) for receiving parallel data and a second output port (shown combined with first input port 520 for simplicity) for transmitting a serial, encoded data stream. The serial, encoded data stream is sent on a return high speed serial connection shown as part of high speed serial connection 110. Preferably parallel data is received by the third input port 515 concurrent with the serialized, encoded data being received at the first input port 520. As sensors 140 are well known in the art, suffice it to say that feedback data from the sensor 140 may be dispatched from the sensor in response to palpable input, physical contact thereon, optical input, sonic input, or other energy/information input as desired.

Figure 7:
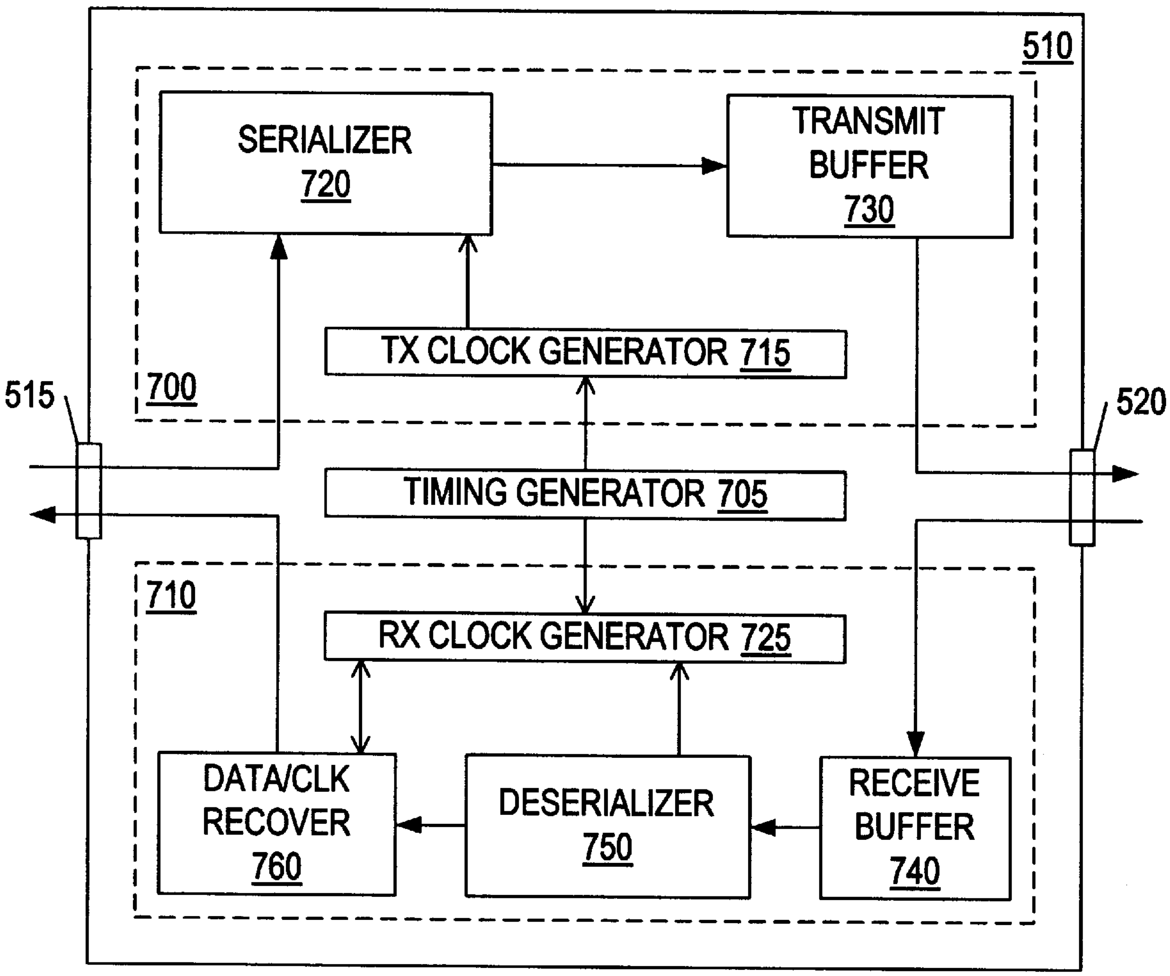
FIG. 7 is block diagram of one embodiment of a serial transceiver core according to the present invention.

A diagram of a preferred embodiment of the internal workings of the TX/RX core 510 is shown in FIG. 7. Included as part of the enhanced graphics interface unit 500 (shown in FIG. 5) and as a part of communications module 600 (shown in FIG. 6) are the base transceiver 510A and the remote transceiver 510B, respectively. For simplicity in the figures, the ports are often combined with a single port being illustrated to represent one or more physical ports. For example, a serial input port and a serial output port are combined as port 520. The first input port 520 and the second output port 520, respectively, input and output native format data in parallel form. Input data are sent to the transmitter 700 to the serializer 720 for conversion into serial data for transmission on the high speed serial connection 110. A timing generator 705 provides a reference clock signal to the transmitter 700 to a TX clock generator 715 for clocking the serial data at the transmission speed of the high speed serial connection 110 rather than the clock signal generated by the timing generator 705. Serialized data which were encoded prior to entering the TX/RX core 510 are then conveyed to a transmit buffer 730 before being output through second output port 520 onto of the high speed serial connection 110. Native format describes the format in which the data are originally created, or thereafter manipulated, in any part of the computer system.

The serialized, encoded data stream incoming to TX/RX core 510 is received at first input port 520 and input to receiver 710 to a receive buffer 740. The serialized, encoded data are transferred to a deserializer 750 which deserializes the data and transfers the deserialized, encoded data to data/clk recovery logic 760. The deserializer 750 also outputs clocking information to a RX clock generator 725. A reference clock signal from timing generator 705, along with clocking information from the deserializer 750 and the data/clk recovery logic 760 allows the RX clock generator 725 to recreate the true timing signal (receive clock signal) from the data. Thus the high speed serial connection is not required to transmit a separate clock signal. The data clock is recovered from the data themselves. The data in its native format is output in parallel to a decoder, along with the recovered clock signal at the first output port 515. The TX/RX core 510 is preferably part of a monolithic integrated circuit that is also preferably a CMOS integrated circuit although other semiconductor materials may also be used.

It will be appreciated to those skilled in the art having the benefit of this disclosure that this invention is believed to be capable of serially transmitting and receiving video, audio and control data to and from a monitor while simultaneously serially transmitting control data from a sensor operably coupled to the monitor. It is intended that the following claims be interpreted to embrace all such modifications and changes and, accordingly, the specification and drawings are to be regarded in an illustrative rather than a restrictive sense.

What is claimed is:

1. A transceiver, including a receiver comprising:

a first input port for receiving solely serialized data consisting of digital data from a computer system;

a deserializer coupled to convert said serialized data into deserialized data;

a timing generator coupled to recover a clock signal from transitions of said digital data and to synchronize said deserialized data using said clock signal;

a first output port for transmitting said deserialized data to a computer monitor; and a second input port adapted for receiving feedback data forwarded from a sensor to an audio and video control unit operably coupled to the transceiver.

2. The transceiver as recited in claim 1, wherein said serialized data comprises video, audio and control data.

3. The transceiver as recited in claim 1, further including a transmitter comprising:

a third input port for receiving parallel data; and a second output port for transmitting solely a serial data stream consisting of digital data.

4. The transceiver as recited in claim 3, wherein said parallel data is received by said third input port concurrent with said serialized data received by said first input port.

5. The transceiver as recited in claim 3, further comprising a serializer coupled to convert said parallel data into said serial data stream.

6. The transceiver as recited in claim 1, wherein said sensor dispatches said feedback data in response to palpable input.

7. The transceiver as recited in claim 1, wherein said sensor dispatches said feedback data in response to optical input.

8. The transceiver as recited in claim 1, wherein said sensor dispatches said feedback data in response to sonic input.

9. The transceiver as recited in claim 1, wherein said sensor dispatches said feedback data in response to physical contact thereon.

10. A communications module adapted for use in a computer monitor, comprising:

a timing generator for generating a clock signal for synchronized timing in the communications module;

a transceiver for transmitting and receiving serialized data selected from the group comprising video, audio and control data, wherein said transceiver includes:

a receiver having a receive buffer for receiving said data, wherein said receiver includes:

a deserializer for converting said serialized data into an input data format recognizable by the computer monitor;

a recovery and alignment logic coupled to said deserializer for recovering said input data and synchronizing the input data;

a receive clock generator which uses said clock signal to recover a data clock from said serialized data;

a transmitter for receiving an output data format recognizable by the computer monitor, wherein said transmitter includes a transmit buffer for transmitting said output data, and wherein said transmitter further includes:

a serializer coupled to said transmit buffer for converting said output data into a serial data stream;

a transmit clock generator which uses said clock signal to synchronize transmission by the transmit buffer and conversion by the serializer of said serial data stream;

an audio and video control unit coupled to receive said input data and dispatch said output data.

11. The communications module of claim 10, further comprising a sound generator for producing audio signals which correspond to the audio input or output data.

12. The communications module of claim 11, wherein said monolithic integrated circuit is a CMOS integrated circuit.

13. The computer monitor of claim 11, wherein said monolithic integrated circuit is a CMOS integrated circuit.

14. The communications module of claim 10, wherein said communications module is a monolithic integrated circuit.

15. The computer monitor of claim 10, wherein said communications module is a monolithic integrated circuit.

16. A computer monitor, comprising:

a communications module adapted for use in the computer monitor, said communications module including:

a timing generator for generating a clock signal for synchronized timing in the communications module;

a transceiver for transmitting and receiving serialized data selected from the group comprising video, audio and control data, wherein said transceiver includes:

a receiver having a receive buffer for receiving said data, wherein said receiver includes:

a deserializer for converting said serialized data into an input data format recognizable by the computer monitor;

a recovery and alignment logic coupled to said deserializer for recovering said input data and synchronizing the input data; and a receive clock generator which uses said clock signal to recover a data clock from said serialized data; and a transmitter for receiving an output data format recognizable by the computer monitor, wherein said transmitter includes a transmit buffer for transmitting said output data, and wherein said transmitter further includes:

a serializer coupled to said transmit buffer for converting said output data into a serial data stream; and a transmit clock generator which uses said clock signal to synchronize transmission by the transmit buffer and conversion by the serializer of said serial data stream;

an audio and video control unit coupled to receive said input data and dispatch said output data; and a display unit for displaying the video input or output data.

17. The computer monitor of claim 16, further comprising a sound generator for producing audio signals which correspond to the audio input or output data.

18. The computer monitor of claim 16, further comprising an input sensor configured to accept input in response to an output of said input or output data.

* * * * *